(12) United States Patent
Tsujimoto

(10) Patent No.: US 8,478,154 B2
(45) Date of Patent: *Jul. 2, 2013

(54) MULTIFUNCTION PERIPHERAL CARRYING OUT A COOPERATIVE PROCESS IN COOPERATION WITH APPLICATION SELECTED FORM PLURALITY OF APPLICATIONS

(75) Inventor: Kunihiko Tsujimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 32 days.

This patent is subject to a terminal disclaimer.

(21) Appl. No.: 13/224,407

(22) Filed: Sep. 2, 2011

(65) Prior Publication Data

US 2012/0057183 A1   Mar. 8, 2012

(30) Foreign Application Priority Data

Sep. 6, 2010   (JP) .................................. 2010-198873

(51) Int. Cl.
*G03G 15/20*   (2006.01)

(52) U.S. Cl.
USPC ............................ 399/70; 358/1.15; 358/1.16

(58) Field of Classification Search
USPC .......................... 358/1.13, 1.15, 1.16; 399/70
See application file for complete search history.

(56) References Cited

U.S. PATENT DOCUMENTS

| 7,814,236 B2 | 10/2010 | Tsujimoto |
| 2007/0159663 A1 | 7/2007 | Tsujimoto |

FOREIGN PATENT DOCUMENTS

| JP | 2001-201986 A | 7/2001 |
| JP | 2004-222234 A | 8/2004 |
| JP | 2005-297264 A | 10/2005 |
| JP | 2006-099489 | 4/2006 |
| JP | 2006/218810 A | 8/2006 |
| JP | 2006-313452 A | 11/2006 |
| JP | 2007-174400 A | 7/2007 |
| JP | 2008-209825 A | 9/2008 |
| JP | 2009-104207 A | 5/2009 |
| JP | 2009-232219 A | 10/2009 |
| JP | 2010-122827 A | 6/2010 |
| JP | 2011-025607 A | 2/2011 |

*Primary Examiner* — Eric A Rust
(74) *Attorney, Agent, or Firm* — Edwards Wildman Palmer LLP; David G. Conlin; Stephen D. LeBarron

(57) ABSTRACT

The multifunction peripheral registers (i) function information indicative of a type of function executed in a past cooperative process in cooperation with an application and (ii) a URL which was being set when an execution start instruction on the function was received from the application so that the function information and the URL are associated with each other. In a case where (i) a first URL, which is identical to a second URL which is currently set, is registered and (ii) a function indicated by function information associated with the first URL requires a warm-up, a device control section starts the warm-up of, an image forming section.

12 Claims, 11 Drawing Sheets

FIG. 2

| ID | APPLICATION NAME | REGISTRATION ADDRESS | FUNCTION INFORMATION | PARTICULAR PROCESS STATE INFORMATION (URL) |
|---|---|---|---|---|
| 1 | EASY COPY | http://example.com/copy | NONE | NONE |
| 2 | DOCUMENT MANAGEMENT | http://example.com/docmng | SCAN | http://example.com/docmng/scan/start.asp |
|  |  |  | PRINT | http://example.com/docmng/print/start.asp |
| ... | ... | ... | ... | ... |
| N | BUSINESS FORM PRINT | http://example.com/print | PRINT | http://example.com/print/start.asp |

SCREEN ADDRESS : http://example.com/docmng/menu.asp

SCREEN ADDRESS : http://example.com/docmng/scan.asp

SCREEN ADDRESS : http://example.com/docmng/print.asp

FIG. 10

| USER ID | COPYING FUNCTION | SCANNING FUNCTION | FAX FUNCTION | PRINTING FUNCTION |
|---|---|---|---|---|
| 1 | AVAILABLE | AVAILABLE | AVAILABLE | AVAILABLE |
| 2 | UNAVAILABLE | AVAILABLE | AVAILABLE | UNAVAILABLE |
| ... | ... | ... | ... | ... |
| N | AVAILABLE | AVAILABLE | AVAILABLE | AVAILABLE |

FIG. 12

| USER ID | COPYING FUNCTION | SCANNING FUNCTION | FAX FUNCTION | PRINTING FUNCTION |
|---|---:|---:|---:|---:|
| 1 | 154 | 50 | 10 | 0 |
| 2 | 0 | 12 | 5 | 0 |
| ... | ... | ... | ... | ... |
| N | 196 | 75 | 10 | 38 |

FIG. 13

| ID | APPLICATION NAME | REGISTRATION ADDRESS | PARTICULAR PROCESS STATE INFORMATION (URL) |
|---|---|---|---|
| 1 | EASY COPY | http://example.com/copy | NONE |
| 2 | DOCUMENT MANAGEMENT | http://example.com/docmng | http://example.com/docmng/print/start.asp |
| ... | ... | ... | ... |
| N | BUSINESS FORM PRINT | http://example.com/print | http://example.com/print/start.asp |

# MULTIFUNCTION PERIPHERAL CARRYING OUT A COOPERATIVE PROCESS IN COOPERATION WITH APPLICATION SELECTED FORM PLURALITY OF APPLICATIONS

This Nonprovisional application claims priority under 35 U.S.C. §119(a) on Patent Application No. 2010-198873 filed in Japan on Sep. 6, 2010, the entire contents of which are hereby incorporated by reference.

TECHNICAL FIELD

The present invention relates to a multifunction peripheral which operates in cooperation with an application of an information processing apparatus.

BACKGROUND ART

In order that a printer or a multifunction peripheral, each employing an electrophotographic technology, carries out a scanning process or a printing process, it is necessary to (i) stably drive a scanner motor and (ii) set a temperature of a fixing device to fall within a predetermined range. For this purpose, for example, before the printing process is carried out, a warm-up is carried out so that the fixing device has a temperature in the predetermined range.

Such a warm-up causes a user to wait until the warm-up is completed. In order to deal with this, there has been known a technique for reducing a waiting time period of a user. In a case of, for example, a copying apparatus, the warm-up is triggered by an operation, carried out by a user with respect to the copying apparatus, such as an input operation carried out via an operation panel, lifting up a cover of a scanner unit, or supplying a sheet to an auto feeder. Moreover, Patent Literature 1 discloses a method in which, before receiving print data from an external device, an image recording apparatus receives, from the external device, a particular command to warm up the image recording apparatus so that a warm-up of the image recording apparatus is started earlier.

In these years, a multifunction peripheral has been configured to be connected to a PC (personal computer) or the like via a communication network so as to carry out various processes. Specifically, the following technique has been developed. That is, a multifunction peripheral serves as a part of a total application system in such a manner that an application executable on an external information processing apparatus and a function of the multifunction peripheral are caused to operate in cooperation with each other (see Patent Literature 2).

CITATION LIST

Patent Literature

Patent Literature 1
Japanese Patent Application Publication, Tokukai, No. 2006-313452 A (Publication Date: Nov. 16, 2006)
Patent Literature 2
Japanese Patent Application Publication, Tokukai, No. 2007-174400 A (Publication Date: Jul. 5, 2007)

SUMMARY OF INVENTION

Technical Problem

According to the technique disclosed in Patent Literature 2, the multifunction peripheral carries out a process, such as a copying process or a printing process, on receipt of an instruction from an application which operates on the information processing apparatus. With the configuration, the multifunction peripheral cannot recognize which process is to be carried out until it receives the instruction from the application. Accordingly, the multifunction peripheral starts the warm-up after it receives the instruction from the application. This causes a user to wait for a long time until the warm-up of the multifunction peripheral is completed.

Such a problem may be solved by applying the technique disclosed in Patent Literature 1 to the technique disclosed in Patent Literature 2. That is, it is possible to cause the application to transmit in advance, to the multifunction peripheral, a particular command for causing the multifunction peripheral to start carrying out the warm-up. According to such a technique, however, it is necessary for the application to transmit a particular command to the multifunction peripheral. This causes an increase in cost for development of the application.

The present invention is accomplished in view of the problems. An object of the present invention is to provide a multifunction peripheral which reduces a user's waiting time period in a system in which an application executable on an external information processing apparatus and a function of the multifunction peripheral are caused to operate in cooperation with each other.

Solution to Problem

In order to attain the object, a multifunction peripheral of the present invention carries out a cooperative process in cooperation with an application selected from a plurality of applications which are executable on an external information processing apparatus, the multifunction peripheral including: a mode switching target member having (i) a normal operation mode and (ii) a waiting mode which is lower in power consumption than the normal operation mode; a registration processing section which registers, in a storage section, application correspondence information of each of the plurality of applications, the application correspondence information containing function information and particular process state information which are associated with each other, the function information being indicative of a type of a function which was executed by the multifunction peripheral in cooperation with the each of the plurality of applications in a past cooperative process, and the particular process state information being indicative of at least one of (i) a first stage of a process of the each of the plurality of applications at which first stage an execution start instruction on the function is received from the each of the plurality of applications and (ii) a second stage which precedes the first stage by a predetermined number of stage(s); an information obtaining section which obtains current process state information while the multifunction peripheral is carrying out a cooperative process in cooperation with an application selected from the plurality of applications, the current process state information being indicative of a current stage of a process of the application selected from the plurality of applications; and a control section which judges whether or not a predetermined start condition is satisfied, in a case where the control section determines that the predetermined start condition is satisfied, the control section starting (i) a switching operation for switching the mode switching target member from the waiting mode to the normal operation mode or (ii) a part of the switching operation, the predetermined start condition including at least the following Condition A.

Condition A: (i) particular process state information which matches current process state information obtained by the information obtaining section is registered in the storage section and (ii) function information associated with the particular process state information is indicative of a particular function which causes the mode switching target member to be operated.

Moreover, a multifunction peripheral of the present invention carries out a cooperative process in cooperation with an application selected from a plurality of applications which are executable on an external information processing apparatus, the multifunction peripheral including: a mode switching target member having (i) a normal operation mode and (ii) a waiting mode which is lower in power consumption than the normal operation mode; a registration processing section which registers particular process state information in a storage section for, among the plurality of applications, a certain application which executed, in a past cooperative process, a particular function causing the mode switching target member to be operated, the particular process state information being indicative of at least one of (i) a first stage of a process of the certain application at which first stage an execution start instruction on the particular function was received from the certain application and (ii) a second stage which precedes the first stage by a predetermined number of stage(s); an information obtaining section which obtains current process state information while the multifunction peripheral is carrying out a cooperative process in cooperation with an application selected from the plurality of applications, the current process state information being indicative of a current stage of a process of the application selected from the plurality of applications; and a control section which judges whether or not a predetermined start condition is satisfied, in a case where the control section determines that the predetermined start condition is satisfied, the control section starting (i) a switching operation for switching the mode switching target member from the waiting mode to the normal operation mode or (ii) a part of the switching operation, the predetermined start condition including at least the following Condition A'.

Condition A': current process state information obtained by the information obtaining section matches particular process state information registered in the storage section.

Advantageous Effects of Invention

According to the present invention, it is possible to reduce a user's waiting time period in a system in which an application executable on an external information processing apparatus and a function of a multifunction peripheral operate in cooperation with each other.

BRIEF DESCRIPTION OF DRAWINGS

FIG. 2 is a view illustrating an example of an application information management table stored in an application information storage section included in a multifunction peripheral in accordance with Embodiment 1 of the present invention.

FIG. 10 is a view illustrating an example of execution authority information stored in a user information management DB.

FIG. 12 is a view illustrating an example of a management table for managing output sheet number limiting information.

FIG. 13 is a view illustrating a modified example of an application information management table.

DESCRIPTION OF EMBODIMENTS

Embodiment 1

An embodiment of the present invention is described below with reference to FIGS. 1 through 8. The following discusses an embodiment of a multifunction peripheral control system of the present invention.

<Configuration of Multifunction Peripheral Control System 100>

Figure 1:
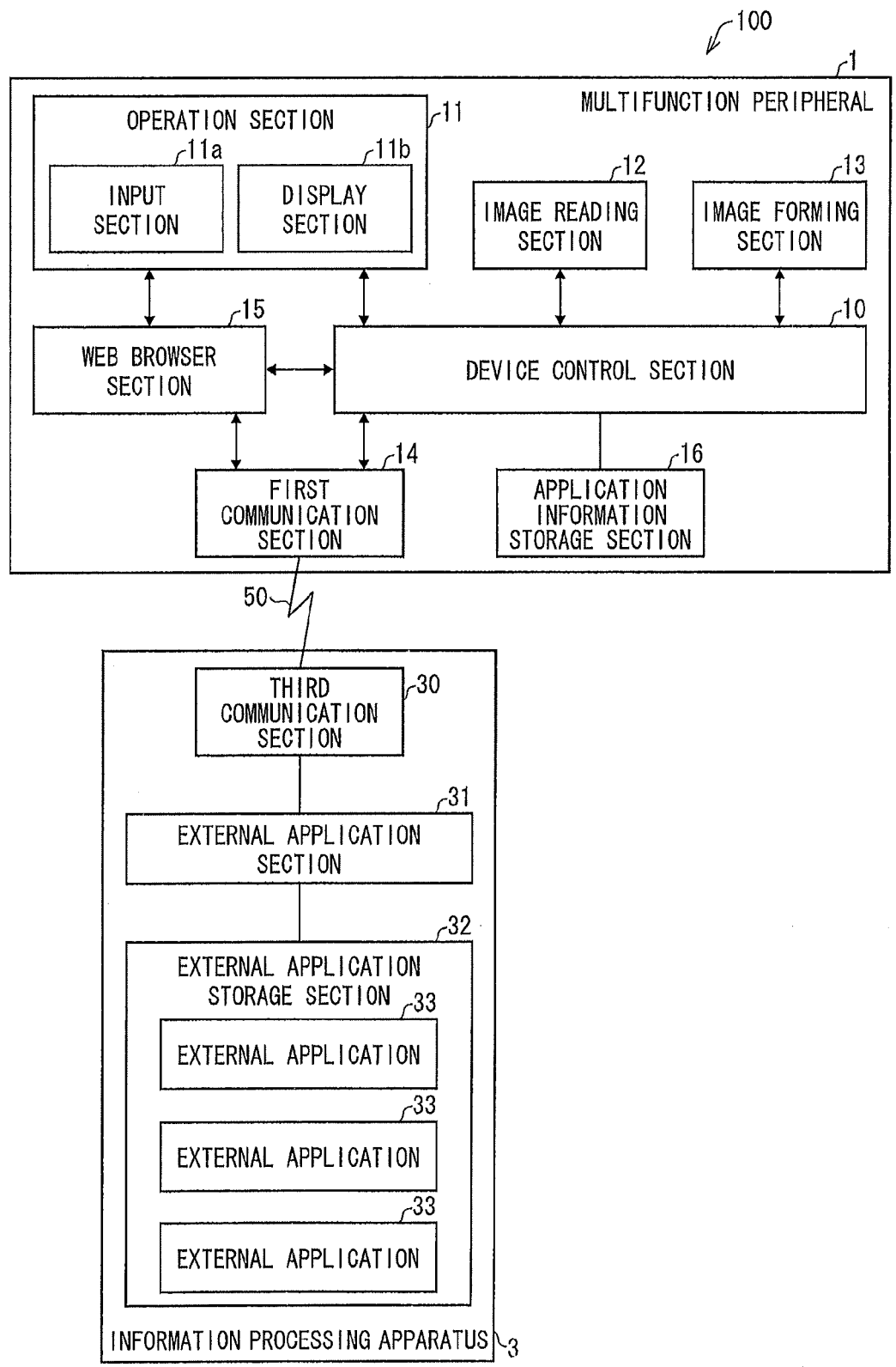
FIG. 1 is a block diagram illustrating a configuration of a multifunction peripheral control system in accordance with Embodiment 1 of the present invention.

FIG. 1 is a block diagram illustrating a configuration of a multifunction peripheral control system 100 in accordance with an embodiment of the present invention. The multifunction peripheral control system 100 includes a multifunction peripheral 1 and an information processing apparatus 3, which communicate with each other via a communication network 50 (see FIG. 1).

The Internet, a telephone line, a serial cable, or other wired or wireless communication lines can be used as the communication network 50. The multifunction peripheral 1 and the information processing apparatus 3 communicate with each other with the use of an HTTP (Hyper Text Transfer Protocol) or an SOAP (Simple Object Access Protocol).

As a matter of course, according to the multifunction peripheral control system 100, (i) a plurality of multifunction peripherals 1 can be provided instead of a single multifunction peripheral 1, and (ii) a plurality of information processing apparatuses 3 can be provided instead of a single information processing apparatus 3. Note that, according to the present embodiment, an application program (application software) is simply referred to as "application".

<Configuration of Multifunction Peripheral 1>

The multifunction peripheral 1 is a digital or analogue multifunction peripheral which carries out various functions (such as a scanning function, a printing function, and a communicating function). The multifunction peripheral 1 includes a device control section (a registration processing section, control section) 10, an operation section 11, an image reading section 12, an image forming section 13, a first communication section 14, a web browser section 15, and an application information storage section (a storage section) 16.

The operation section 11 is a user interface via which (i) a user is notified of various information and (ii) the multifunction peripheral 1 accepts an input, from the user. The operation section 11 includes (i) an input section 11a having various input keys and (ii) a display section 11b such as an LCD (Liquid Crystal Display). Note that the operation section 11 can be configured as a touch panel in which the input section 11a and the display section 11b are integrally provided.

The image reading section 12 includes a scanner and a document carrying section which carries a document to the scanner. The image reading section 12 reads, as image data, objects (such as characters and images) which are printed on a document. Note that the image reading section 12 reads an image so that a read image has a predetermined resolution.

The image forming section 13 is provided for printing an image (character/photograph/graphic) on a recording sheet such as paper in accordance with inputted image data. The image forming section 13 includes constituent members such as a photoreceptor drum, a charging device, an exposure device, a developing device, a transfer device, a fixing device, and a sheet tray. Specifically, the image forming section 13 carries out a printing in the following procedure. First, a surface of the photoreceptor drum is electrostatically charged by the charging device. Then, the photoreceptor drum is irradiated with light by the exposure device in accordance with image data so that the surface of the photoreceptor drum is charged in a pattern identical to an image indicated by the image data. Subsequently, toner is attracted to the surface of the photoreceptor drum by the developing device, and then the transfer device transfers a toner image to a recording sheet. Ultimately, the fixing device applies heat to the toner so that the toner is melted and fixed to the recording sheet. This is how an image is formed on a recording sheet. Such a printing process is carried out on the basis of image data supplied from the image reading section 12 or image data supplied from an external device.

Here, it is necessary to apply sufficient heat to the toner so that the toner is fixed. It is therefore necessary to sufficiently apply electricity to a heater of the fixing device so that a contact face, which is to be in contact with the toner, of the fixing device has a temperature falling within a predetermined range (e.g., a range from 160° C. to 180° C.). In view of energy saving, however, there is a demand for keeping power consumption of the heater of the fixing device as low as possible. In order to meet such a demand, the image forming section 13 has a normal operation mode and a waiting mode. According to the normal operation mode, the contact face, which is to be in contact with the toner, of the fixing device is set to have an appropriate temperature to fix the toner onto the recording sheet. On the other hand, according to the waiting mode, the power consumption is suppressed to be lower than that of the normal operation mode. In other words, the fixing device is set so that a less amount of electric power is applied to the heater of the fixing device in the waiting mode than in the normal operation mode. Before carrying out the printing process, the image forming section 13 carries out a warm-up so as to be switched from the waiting mode to the normal operation mode. Then, the image forming section 13 is switched from the normal operation mode to the waiting mode, in a case where no instruction to carry out another printing process is made within a predetermined time period after the printing process is competed. Note that the image forming section 13 starts the warm-up of the fixing device in response to an instruction received from the device control section 10. The image forming section 13 thus serves as a mode switching target member having the normal operation mode and the waiting mode. According to the present embodiment, a function which causes the image forming section 13 to be operated is a function for which the warm-up needs to be carried out so that the image forming section 13 is switched over from the waiting mode to the normal operation mode. Such a function which causes the image forming section 13 to be operated (i.e., a function for which the warm-up needs to be carried out) can be (i) a copying function which carries out a printing of image data obtained by the image reading section 12 or (ii) a printing function which carries out a printing of externally obtained image data.

The first communication section 14 is an interface which communicates with an external device such as an information processing apparatus 3 via the communication network 50. According to the present embodiment, the first communication section 14 communicates with the information processing apparatus 3 with the use of the HTTP or the SOAP.

The web browser section 15 is operated in accordance with software of a web browser and obtains information associated with a URL (uniform resource locator) set in the web browser section 15. When the multifunction peripheral 1 and the information processing apparatus 3 operate in cooperation with each other, the web browser section 15 communicates information with an external application section 31 included in the information processing apparatus 3.

The application information storage section 16 stores an application information management table containing application correspondence information in which an application name, a registration address (a URL in the present embodiment), function information, and particular process state information are associated with each other. The application name and the registration address serve as application identification information for identifying an external application 33 included in the information processing apparatus 3. The function information is indicative of a type of function which was carried out by the multifunction peripheral 1 in cooperation with the external application 33 in the past. The particular process state information is indicative of a stage of a process of the external application 33 at the time when an execution start instruction on the function was received from the external application 33.

The registration address is an address for accessing the external application 33. Moreover, according to the present embodiment, the particular process state information is a URL which was set in the web browser section 15 when an execution start instruction on a function, whose type is indicated by function information, was received from the external application 33 in a past cooperative process.

FIG. 2 is a view illustrating an example of the application information management table. In FIG. 2, the application correspondence information for each application is associated with a corresponding ID. Note that the pieces of application correspondence information correspond to the respective external applications 33 stored in the information processing apparatus 3.

The device control section 10 controls the sections of the multifunction peripheral 1. Specifically, the device control section 10 controls an operation of each of the sections such as the operation section 11, the image reading section 12, the image forming section 13, the first communication section 14, and the web browser section 15. For example, the device control section 10 controls the image reading section 12 so as to obtain data of a scanned image. Moreover, the device control section 10 controls the image forming section 13 so as to form an image, which is indicated by inputted image data, on a sheet as an output.

The device control section 10 also serves as registration processing section which carries out a registration process and an updating process with respect to the application information management table stored in the application information storage section 16. Details of the registration and updating processes will be described later.

The device control section 10 (i) stores, via the first communication section 14, inputted image data in a designated external device (e.g. the information processing apparatus 3) or (ii) transmits, to a designated address via the first communication section 14, e-mail to which the inputted image data is attached.

The multifunction peripheral 1 having such configuration, for example, (i) receives, from the information processing apparatus 3, HTML (Hypertext Markup Language) data indicative of an operation screen and (ii) causes the web browser section 15 to display the operation screen indicated by the HTML data. Then, the multifunction peripheral 1 transmits, to the external application section 31 of the information processing apparatus 3, information supplied via the operation screen. After that, the multifunction peripheral 1 carries out a corresponding function in accordance with a control command received from the external application section 31.

<Configuration of Information Processing Apparatus 3>

Next, the following describes a configuration of the information processing apparatus 3. The information processing apparatus 3 is a computer device constituted by constituent members such as (i) an arithmetic processing section such as a CPU or a dedicated processor and (ii) a storage section such as an RAM, an ROM, or an HDD, and serves as a web server device that is shared by a plurality of multifunction peripherals 1. The information processing apparatus 3 includes a third communication section 30, the external application section 31, and an external application storage section 32.

The third communication section 30 is an interface which communicates with an external device such as the multifunction peripheral 1 via the communication network 50. According to the present embodiment, the third communication section 30 communicates with the multifunction peripheral 1 with the use of the HTTP or the SOAP, as above described.

The external application storage section 32 stores various external applications 33, each of which is used to control the multifunction peripheral 1.

The external application section 31 carries out an operation in accordance with a predetermined web application. That is, the external application section 31 carries out an operation in accordance with a corresponding one of various web applications which operate on a web server. Such web applications (i) are custom applications described in, for example, Java (registered trademark) script, and (ii) operate in a Java (registered trademark) script execution environment provided on the web server. The external application section 31 reads out, from the external application storage section 32, an external application 33 requested by the multifunction peripheral 1, and carries out a process in accordance with the external application 33.

<Information Registration and Updating of Application Information Management Table>

Next, the following describes (i) a process of registering information in the application information management table stored in the application information storage section 16 and (ii) a process of updating the application information management table. When the device control section 10 accepts, via the operation section 11, an instruction to register a new external application in the application information management table, the device control section 10 prompts a user to enter application identification information such as an application name and a registration address. Then, the device control section 10 additionally registers, in the application information management table, application correspondence information in which (i) the application identification information thus entered, (ii) corresponding function information, and (iii) corresponding particular process state information are associated with each other. In this process, the device control section 10 registers "None" as each of the function information and the particular process state information.

When the device control section 10 receives an instruction to edit the application identification information (an application name and a registration address) which has been already registered in the application information management table, the device control section 10 prompts the user to enter an instruction to select application correspondence information to be edited. Then, the device control section 10 causes application identification information, which corresponds to the application correspondence information thus selected, to be displayed so as to prompt the user to enter an instruction on editing the application identification information. After that, the device control section 10 updates, in accordance with the instruction on editing, the application correspondence information. In this process, the device control section 10 changes the device information and the particular process state information, which are associated with the application correspondence information to be edited, to "None" (i.e., deletes the device information and the particular process state information).

The device control section 10 (i) identifies application correspondence information for an external application 33 that is carrying out a cooperative process with the multifunction peripheral 1, and (ii) registers, as function information in the application correspondence information, information indicative of a type of a function to which an execution start instruction is issued by the information processing apparatus 3 in the cooperative process. Moreover, the device control section 10 registers, as particular process state information in the application correspondence information, a URL which is set in the web browser section 15 when the device control section 10 receives the execution start instruction on the function.

Specifically, the device control section 10 (i) generates information indicative of a type of a function (hereinafter, referred to as "generated information") to which an execution start instruction is issued and (ii) obtains, from the web browser section 15, a URL (hereinafter, referred to as "obtained URL") which is set in the web browser section 15 when the device control section 10 receives the execution start instruction. Then, the device control section 10 checks whether or not the generated information is already registered as function information. In a case where the generated information is not registered as function information, the device control section 10 registers (i) the generated information as function information and (ii) the obtained URL as particular process state information associated with the function information. On the other hand, in a case where the generated information has been registered as function information, the device control section checks whether or not the obtained URL matches particular process state information associated with the function information. In a case where the obtained URL matches the particular process state information, the device control section 10 does not update the function information and the particular process state information. Whereas, in a case where the obtained URL does not match the particular process state information, the device control section 10 registers the obtained URL as particular process state information or updates the particular process state information by the obtained URL.

<Outline of Cooperative Process>

Next, the following describes an outline of a cooperative process carried out by the external application 33 and the multifunction peripheral 1. First, the device control section 10 of the multifunction peripheral 1 reads out, from the application information storage section 16, a registration address selected by a user. Then, the device control section 10 starts up the web browser section 15 so that the web browser section 15 accesses a URL indicated by the registration address. This causes the web browser section 15 to communicate with the external application section 31 of the information processing apparatus 3. The web browser section 15, for example, receives data of an operation screen from the external application section 31 and displays the operation screen. Moreover, when information is entered via the operation screen, the web browser section 15 transmits the information to the external application section 31. Then, the external application section 31 carries out predetermined process in accordance with the information received from the web browser section 15, and consequently the external application section 31 (i) creates an execution start instruction on a corresponding function of the multifunction peripheral 1 and (ii) transmits the execution start instruction to the multifunction peripheral 1. In response to the execution start instruction, the device control section 10 of the multifunction peripheral 1 controls the sections of the multifunction peripheral 1 so that a function to which the execution start instruction is issued is carried out. In this manner, the multifunction peripheral 1 and the external application 33 of the information processing apparatus 3 carry out the process in cooperation with each other.

In a cooperative process, the multifunction peripheral 1 transmits, to the information processing apparatus 3, information together with device information which is unique to the multifunction peripheral 1. Here, the device information is identification information with which one multifunction peripheral can be distinguished from other devices. As for the multifunction peripheral 1, the device information is identification information with which the multifunction peripheral 1 can be distinguished from other devices (such as other multifunction peripherals). The device information of the multifunction peripheral 1 can be, for example, a device number (serial number) unique to the multifunction peripheral 1 or an MAC (Media Access Control) address unique to the multifunction peripheral 1. With the use of the device information, the information processing apparatus 3 can identify the multifunction peripheral 1 which is to be controlled to carry out various functions.

The multifunction peripheral 1 causes the information processing apparatus 3 to invoke a function of an external application 33 (hereinafter, referred to as "external application function") and obtains a result of a process carried out with the use of the external application function. One (1) external application function corresponds to one (1) external application 33 stored in the information processing apparatus 3. It is possible to cause the multifunction peripheral 1 to have an external application function per external application 33 stored in the information processing apparatus 3.

Here, the multifunction peripheral 1 and the external application section 31 communicate with each other with the use of a general network technique. This makes it possible to use a lot of general tools and skills to develop a cooperation part between the device control section 10 (firmware in the device control section 10) and the external application section 31. It is therefore possible to easily provide the multifunction peripheral 1 with the external application functions and to reduce cost of development in the cooperation part.

<Process Flow>

Figure 3:
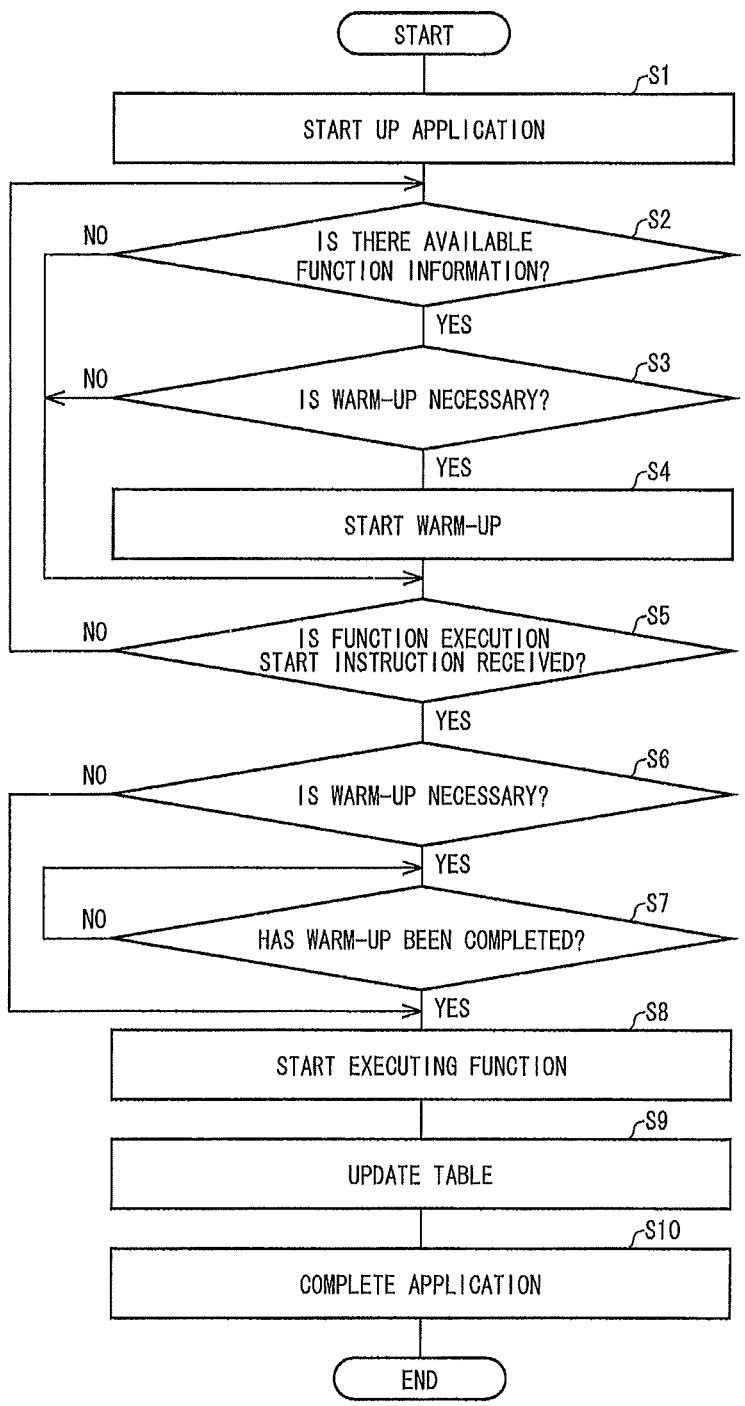
FIG. 3 is a flowchart illustrating how processes are carried out in the multifunction peripheral control system in accordance with Embodiment 1 of the present invention.

Next, the following describes how processes are carried out in the multifunction peripheral control system 100 of the present embodiment. Here, a warm-up, which is a characteristic process of the present invention, is mainly described. FIG. 3 is a flowchart illustrating how processes are carried out in the multifunction peripheral control system 100.

Figures 4, 5:
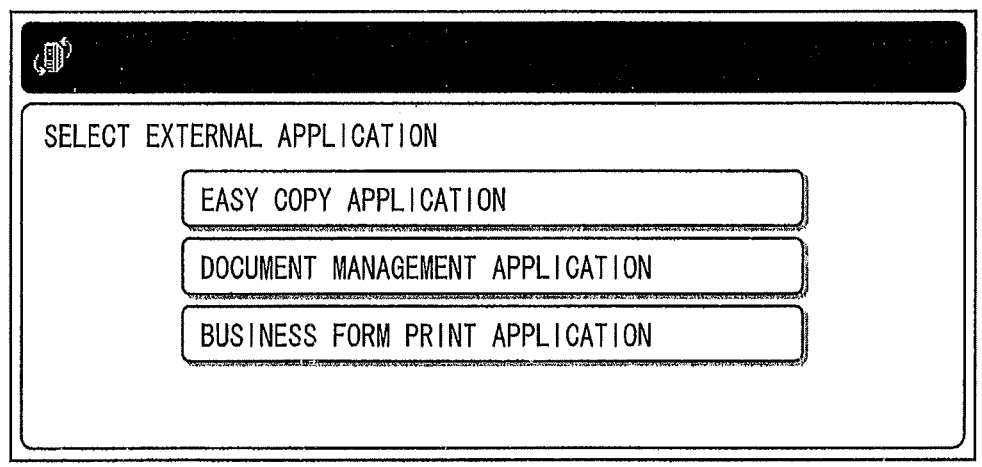
FIG. 4 is a view illustrating an example of a screen in which an application identification information list is shown.
FIG. 5 is a view illustrating an example of an operation screen which is displayed on the multifunction peripheral in a cooperative process carried out by an external application and the multifunction peripheral.

First, the device control section 10 causes the display section 11*b* to display a list of application names in the application information management table, which is stored in the application information storage section 16, so as to prompt a user to select an application name. FIG. 4 is an example of a screen showing a list of application names. When an application name is selected, the device control section 10 starts up the web browser section 15 so that the web browser section 15 accesses a URL indicated by a registration address associated with the application name selected by the user (S1) (here, the application selected in the step S1 is referred to as "selected application"). This allows the web browser section 15 and the information processing apparatus 3 to communicate with each other for transmitting/receiving data such as data of an operation screen or of various commands. For example, the external application section 31 transmits, to the multifunction peripheral 1, data indicative of an operation screen (see FIG. 5) via which a user can log in a corresponding external application 33. Note that the operation screen shown in FIG. 5 corresponds to a URL "http://example.com/docmng".

Next, the device control section 10 identifies, in the application information management table, function information which is associated with the application identification information selected by the user, and judges whether or not the function information is registered in the application information management table (S2).

In a case where the device control section 10 determines that the function information is registered, i.e., in a case where the function information is not registered as "None" in the application information management table (Yes in S2), the device control section 10 judges whether or not a warm-up needs to be carried out (S3). Specifically, the device control section 10 judges whether or not (a) function whose type is indicated by the function information is a function for which a warm-up needs to be carried out and (b) a URL which is indicated by particular process state information associated with the function information matches current process state information which is indicative of a current stage of a process of the external application 33. According to the present embodiment, the current process state information is a URL which is currently set in the web browser section 15. In other words, the device control section 10 judges whether or not the following Condition A is satisfied.

Condition A: (i) particular process state information which matches a URL (current process state information) currently set in the web browser section 15 is registered in the application information storage section 16 and (ii) function information associated with the particular process state information is indicative of a particular function (in this embodiment, printing function or copying function) which causes the image forming section 13 to be operated.

Note that the device control section 10 serves as an information obtaining section which obtains, as current process state information, a currently set URL from the web browser section 15.

In a case where Condition A is satisfied, i.e., in a case where (i) a function whose type is indicated by the function information is a function for which a warm-up needs to be carried out and (ii) a URL indicated by the particular process state information is identical to a URL being currently set, the device control section 10 determines that the image forming section 13 needs to be warmed up. In other cases, the device control section 10 determines that a warm-up does not need to be carried out.

Here, the function for which the warm-up needs to be carried out is a function which causes a mode switching target member to be operated. Such a mode switching target member has a waiting mode and a normal operation mode between which the mode switching target member is switched over. According to the present embodiment, the multifunction peripheral 1 includes the image forming section 13 as the mode switching target member. A printing function or a copying function serves as the function which causes the image forming section 13 to be operated. The device control section 10 (i) has stored in advance, for each type of function, warm-up necessary/unnecessary information which is indicative of whether or not a warm-up needs to be carried out for a corresponding function and (ii) carries out, in accordance with the warm-up necessary/unnecessary information, the process in the step S3. According to the present embodiment, the device control section 10 can store warm-up necessary/unnecessary information which indicates that a warm-up needs to be carried out for the printing function or the copying function.

In a case where the device control section 10 determines that a warm-up needs to be carried out (Yes in S3), the device control section 10 starts the warm-up of the image forming section 13 (S4). That is, the device control section 10 causes the image forming section 13 to start a switching operation for switching over from the waiting mode to the normal operation mode. Then, the device control section 10 proceeds to the step S5.

Whereas, in a case where the function information is not registered (i.e., "None") in the application information management table (No in S2) or in a case where the device control section 10 determines that a warm-up does not need to be carried out (No in S3), the device control section 10 also proceeds to the step S5.

In the step S5, the device control section 10 judges whether or not the device control section 10 has received an execution start instruction on a corresponding function from the external application 33 of the information processing apparatus 3 (S5).

In a case where the device control section 10 has not received an execution start instruction, the device control section 10 returns to the step S2. Specifically, in a case where the device control section 10 has not received an execution start instruction, it is assumed that communications between the web browser section 15 and the external application section 31 have proceeded and therefore a URL set in the web browser section 15 has changed. In such a case, the judgment process in the step S3 is to be repeatedly carried out, every time a URL is changed, based on a currently set URL until the device control section 10 receives an execution start instruction.

Figure 6:
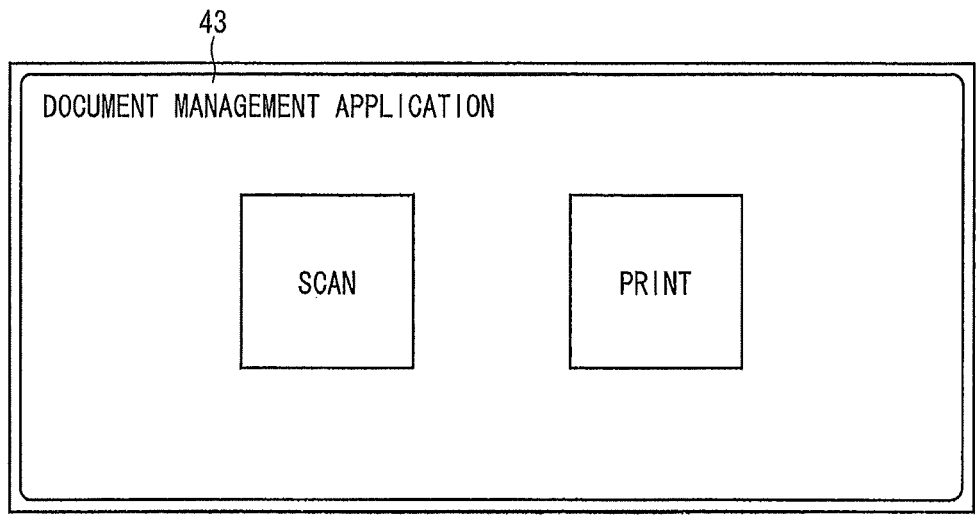
FIG. 6 is a view illustrating another example of an operation screen which is displayed on the multifunction peripheral in a cooperative process carried out by an external application and the multifunction peripheral.

Each of FIGS. 5 through 8 exemplifies a screen which is to be displayed on the display section 11b during the communication process between the web browser section 15 and the external application section 31. FIG. 5 illustrates an example of an operation screen 42 via which a user logs in a corresponding external application 33, and the operation screen 42 corresponds to a URL "http://example.com/docmng". FIG. 6 illustrates an example of a screen 43 which is to be displayed, after the login process is carried out via the screen 42 shown in FIG. 5, so that the user is prompted to select a scanning function or a printing function. The screen 43 shown in FIG. 6 corresponds to a URL "http://example.com/docmng/menu.asp".

Figure 7:
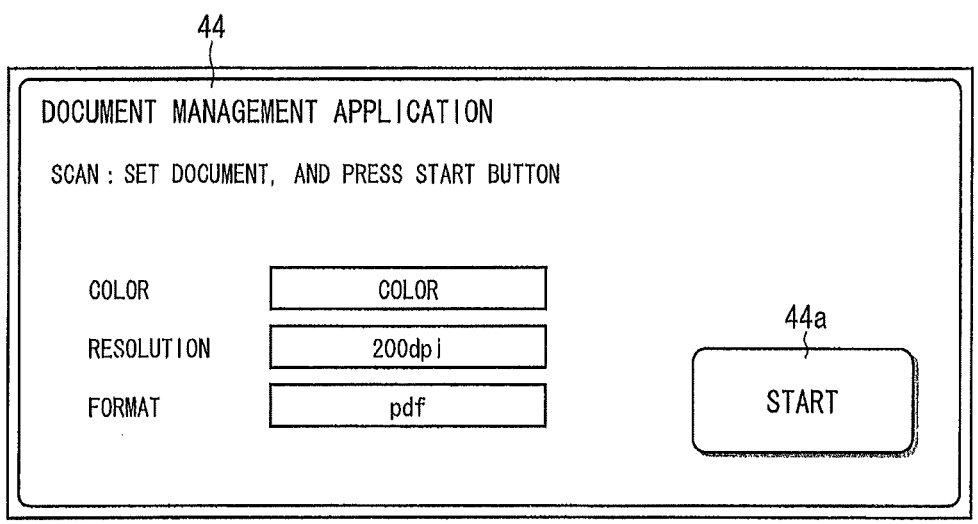
FIG. 7 is a view illustrating still another example of an operation screen which is displayed on the multifunction peripheral in a cooperative process carried out by an external application and the multifunction peripheral.

FIG. 7 illustrates an example of a screen 44 which is to be displayed after the scanning function is selected on the screen 43 shown in FIG. 6. The screen 44 prompts the user to set conditions on the scanning function and to enter an execution instruction on the scanning function. The screen shown in FIG. 7 corresponds to a URL "http://example.com/docmng/scan.asp". When a start button 44a on the screen 44 is pressed, a URL "http://example.com/docmng/scan/start.asp" is set in the web browser section 15 and a communication is to be carried out based on the URL thus set. Here, the web browser section 15, in which the URL "http://example.com/docmng/scan/start.asp" is set, notifies the external application section 33 of information indicating that the start button on the scanning function has been pressed. Then, the external application section 33 generates an execution start instruction on the scanning function and transmits the execution start instruction thus generated to the multifunction peripheral 1.

Figure 8:
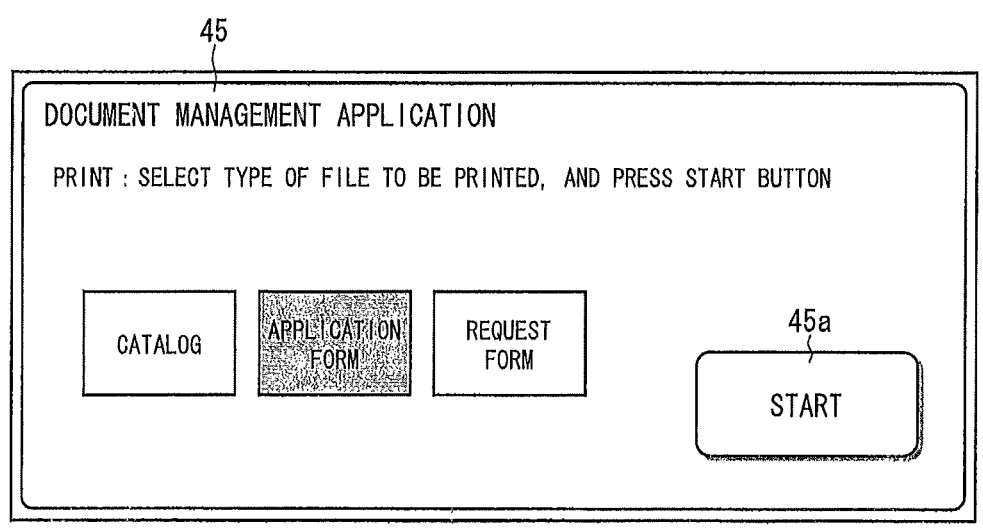
FIG. 8 is a view illustrating yet another example of an operation screen which is displayed on the multifunction peripheral in a cooperative process carried out by an external application and the multifunction peripheral.

FIG. 8 illustrates a screen 45 which is displayed after the printing function is selected on the screen 43 shown in FIG. 6. The screen 45 exemplifies a screen for prompting the user to set conditions on the printing function and to input an execution instruction on the printing function. The screen 45 shown in FIG. 8 corresponds to a URL "http://example.com/docmng/print.asp". When a start button 45a is pressed on the screen 45, a URL "http://example.com/docmng/print/start.asp" is set in the web browser section 15 and a communication is to be carried out based on the URL thus set. Here, the web browser section 15, in which the URL "http://example.com/docmng/print/start.asp" is set, notifies the external application section 33 of information indicating that the start button on the printing function has been pressed. Then, the external application section 33 generates an execution start instruction on the printing function and transmits the execution start instruction thus generated to the multifunction peripheral 1.

The following concretely describes an example case where the application information management table shown in FIG. 2 is stored in the application information storage section 16. In this case, while a screen of, for example, FIG. 5 or 6 is being displayed on the display section 11b, a URL set in the web browser section 15 does not match particular process state information. Therefore, it is determined that a warm-up does not need to be carried out.

When the start button 44a is pressed on the screen 44 shown in FIG. 7 and therefore a URL set in the web browser section 15 is changed to the URL "http://example.com/docmng/scan/start.asp", it is determined that the URL being set in the web browser section 15 matches particular process state information. Note that function information corresponding to the particular process state information indicates "scan". According to the present embodiment, the scanning function does not require a warm-up. Therefore, the device control section 10 determines that a warm-up does not need to be carried out.

On the other hand, when the start button 45a is pressed on the screen 45 shown in FIG. 8 and therefore a URL set in the web browser section 15 is changed to the URL "http://example.com/docmng/print/start.asp", it is determined that the URL being set in the web browser section 15 matches particular process state information. Moreover, function information corresponding to the particular process state information indicates "print". According to the present embodiment, the printing function requires a warm-up. Therefore, the device control section 10 determines that a warm-up needs to be carried out.

When the device control section 10 detects a reception of an execution start instruction from the external application 33 in the step S5 (Yes in S5) while the processes of the steps S2 through S5 are repeatedly carried out as above described, the device control section 10 judges whether or not a function to which the execution start instruction has been issued is a function for which a warm-up needs to be carried out (S6). This judgment can be carried out based on the warm-up necessary/unnecessary information.

In a case where the execution start instruction is not directed to the function requiring the warm-up (No in S6), the device control section 10 starts to carry out a function corresponding to the execution start instruction (S8).

On the other hand, in a case where the execution start instruction is directed to a function requiring the warm-up (Yes in S6), the device control section 10 waits until the warm-up is completed, that is, until the image forming section 13 serving as the mode switching target member is switched to the normal operation mode (S7). Then, after the warm-up is completed (Yes in S7), that is, after the image forming section 13 is switched to the normal operation mode, the device control section 10 causes the image forming section 13 to carry out the function corresponding to the execution start instruction (S8).

Then, the device control section 10 carries out an updating process so as to update the function information associated with the application identification information selected in the step S1 (S9). The following describes details of the updating process. The device control section 10 (i) generates information indicative of a type of function to be carried out in accordance with an execution start instruction received in the step S5 and (ii) obtains, from the web browser section 15, a URL being set in the web browser section 15 when the execution start instruction is received. Then, the device control section 10 carries out an updating process with respect to the application information management table based on the method described in the foregoing <Information Registration and Updating Application Information Management Table>. This causes each piece of application correspondence information in the application information management table to contain (i) function information indicative of a type of function which was carried out in the past and (ii) particular process state information indicative of a URL which was set in the web browser section 15 when an execution start instruction on the function was received.

The following describes a case where, for example, the start button 45a is pressed on the screen 45 shown in FIG. 8 and therefore a URL set in the web browser section 15 is changed to "http://example.com/docmng/print/start.asp", and then an execution start instruction on the printing function is received. In this case, the device control section 10 generates information indicative of the printing function and obtains the URL "http://example.com/docmng/print/start.asp" being set in the web browser section 15. Then, the information thus generated is registered as function information and the URL thus obtained is registered as particular process state information. In this manner, application correspondence information such as the one corresponding to ID=2 in FIG. 2 is registered.

Then, when the device control section 10 receives a termination command from the external application 33, which is indicated by the application identification information selected in the step S1, the device control section 10 (i) determines that the cooperative process carried out with the external application 33 has been completed and (ii) causes the screen on the operation section 11 to display an initial screen again (S10). The cooperative process is thus completed.

According to the present Embodiment 1, the device control section 10 identifies, from the application information storage section 16, function information and particular process state information associated with application identification information selected in the step S1. Then, the device control section 10 judges whether or not a type of function indicated by the identified function information requires the warm-up, i.e., whether or not the function information is indicative of a particular function for which the image forming section 13, which is the mode switching target member, needs to be operated. Moreover, the device control section 10 judges whether or not a URL which is currently set in the web browser section 15 matches particular process state information. That is, the device control section 10 determines whether or not the foregoing Condition A is satisfied.

Then, in a case where (i) the type of function indicated by the identified function information is the function which requires the warm-up and (ii) the URL which is currently set in the web browser section 15 matches the particular process state information (i.e., Condition A is satisfied), the warm-up of the image forming section 13 is started. That is, the warm-up, which is the switching operation for switching the image forming section 13 from the waiting mode to the normal operation mode, is started. This makes it possible to start, before an execution start instruction on the function which requires the warm-up is received, the operation for switching the image forming section 13 from the waiting mode to the normal operation mode. Consequently, it is possible to shorten waiting time of the user.

Embodiment 2

The following describes another embodiment of the present invention with reference to FIGS. 9 through 12. For convenience, the same reference numerals are given to constituent members which have functions identical to those described in the drawings of Embodiment 1, and descriptions of such constituent members are omitted here.

Figure 9:
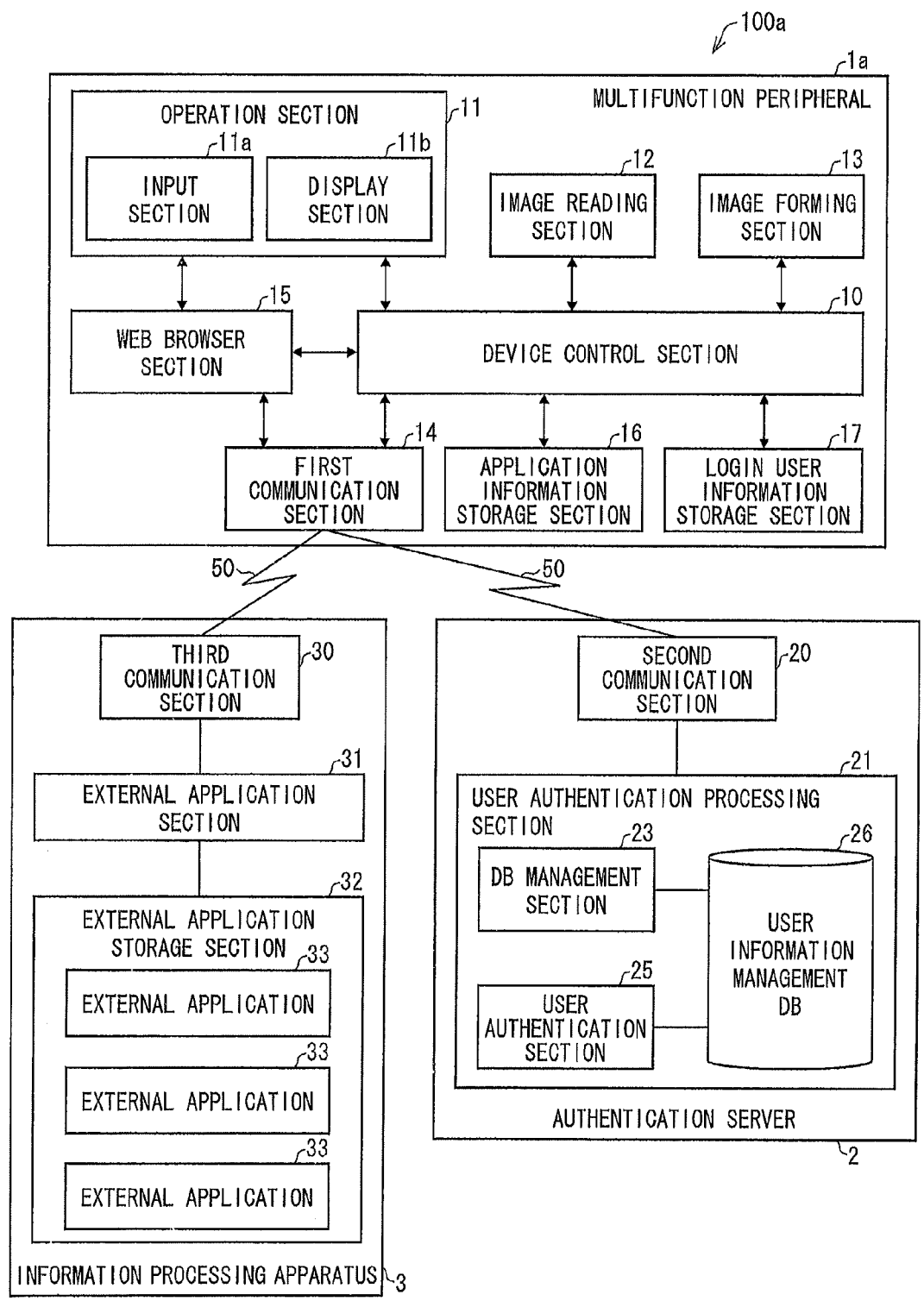
FIG. 9 is a view illustrating a configuration of a multifunction peripheral control system in accordance with Embodiment 2 of the present invention.

FIG. 9 illustrates a configuration of a multifunction peripheral control system 100a in accordance with Embodiment 2 of the present invention. The multifunction peripheral control system 100a includes an authentication server 2, in addition to a multifunction peripheral 1a and an information processing apparatus 3 (see FIG. 9).

The authentication server 2 is a computer device constituted by an arithmetic processing section such as a CPU or a dedicated processor, and a storage section such as an RAM, an ROM, or an HDD. The authentication server 2 serves as a device which carries out authentication with respect to the multifunction peripheral 1a. The multifunction peripheral 1a and the authentication server 2 communicate with each other with the use of, for example, an LDAP (Light Directory Access Protocol).

The authentication server 2 includes a second communication section 20 and a user authentication processing section 21. The second communication section 20 serves as an interface which communicates with an external device such as the multifunction peripheral 1a.

The user authentication processing section 21 carries out an authentication process with respect to a user. The user authentication processing section 21 includes a user authentication section 25, a user information management database (DB) 26, and a database (DB) management section 23.

In the user information management DB 26, user registration information is registered in advance per user. The user information management DB 26 stores, as the user registration information, user authentication information (e.g., a login name or a password) which is used in the authentication process so that the user is allowed to operate the multifunction peripheral 1*a*. In addition to the user authentication information, the user information management DB 26 also stores execution authority information indicative of a type of function available to the user. FIG. 10 is a view illustrating an example of the execution authority information stored in the user information management DB 26. As shown in FIG. 10, the user information management DB 26 stores, for each user, execution authority information indicative of whether or not each of various functions of the multifunction peripheral 1*a* is available to the each user.

The user authentication section 25 obtains login information transmitted from the multifunction peripheral 1*a*, and carries out the authentication process by checking whether or not the login information matches the user registration information that has been stored in the user information management DB 26 in advance. Then, in a case where the authentication is successfully carried out, the user authentication section 25 obtains execution authority information associated with the user from the user information management DB 26, and transmits, to the multifunction peripheral 1*a*, (i) the execution authority information thus obtained and (ii) an authentication result indicative of the success of authentication. On the other hand, in a case where the authentication is unsuccessfully carried out, the user authentication section 25 transmits, to the multifunction peripheral 1*a*, an authentication result indicative of the failure of authentication.

Further, the multifunction peripheral 1*a* of the present embodiment is different from the multifunction peripheral 1 of Embodiment 1 in that the multifunction peripheral 1*a* further includes a login user information storage section 17.

A device control section 10 of the multifunction peripheral 1*a* of the present embodiment prompts a user to enter login information, and then transmits entered login information to the authentication server 2. In a case where an authentication result received from the authentication server 2 indicates failure of authentication, the device control section 10 does not accept, from the user, any execution instructions on various functions of the multifunction peripheral 1*a*. On the other hand, in a case where an authentication result received from the authentication server 2 indicates success of authentication, the device control section 10 (i) causes an operation screen (such as a screen shown in FIG. 4) to be displayed so as to prompt the user to enter an instruction to select an external application 33 and (ii) stores, in the login user information storage section 17, execution authority information which has been received together with the authentication result. Moreover, when the device control section 10 receives a completion notice from the external application 33, the device control section 10 deletes execution authority information stored in the login user information storage section 17. This allows the login user information storage section 17 to store the execution authority information for the user who is currently in a login state.

According to the present embodiment, the device control section 10 starts a warm-up only when the execution authority information, stored in the login user information storage section 17, indicates that the function requiring the warm-up is available to the user.

Figure 11:
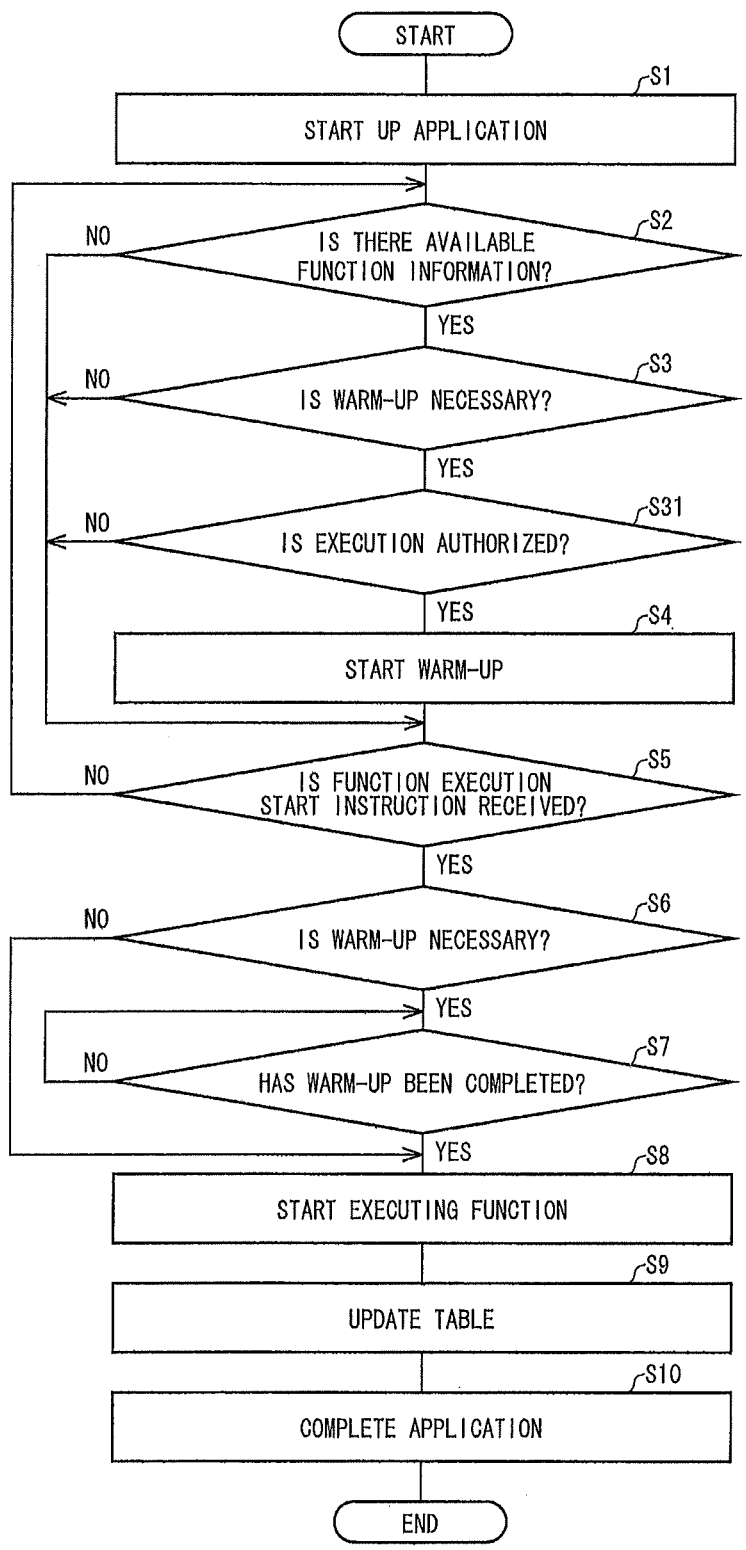
FIG. 11 is a flowchart illustrating how processes are carried out in the multifunction peripheral control system in accordance with Embodiment 2 of the present invention.

The following describes how the processes relating to the warm-up are carried out in the multifunction peripheral control system 100*a* of the present embodiment. FIG. 11 is a flowchart illustrating how processes are carried out in the multifunction peripheral control system 100*a*.

The multifunction peripheral control system 100*a* carries out a process of a step S31 (see FIG. 11), which process is not carried out in the processes shown in FIG. 3. In view of this, the following mainly describes the process of the step S31.

As shown in FIG. 11, in a case where the device control section 10 determines, in the step S3, that the warm-up needs to be carried out (Yes in S3), the device control section 10 carries out the step S31. In the step S31, the device control section 10 checks execution authority information, which is stored in the login user information storage section 17, so as to judge whether or not the function for which the warm-up needs to be carried out is available to the user. Then, only in a case where the function is available to the user (Yes in S31), the device control section 10 starts the warm-up (S4). Whereas, in a case where the function is not available to the user (No in S31), the device control section 10 does not start the warm-up because the function is not to be carried out.

In a case where, for example, execution authority information corresponding to a user ID of "1" (see FIG. 10) is stored in the login user information storage section 17, the copying function and the printing function, for which the warm-up of the image forming section 13 needs to be carried out, are available. The device control section 10, therefore, starts the warm-up. On the other hand, in a case where execution authority information, corresponding to a user ID of "2" (see FIG. 10) is stored in the login user information storage section 17, neither the copying function nor the printing function is available. In this case, the device, control section 10 does not start the warm-up. Note that, in a case where one of the copying function and the printing function is available, the device control section 10 starts the warm-up.

According to the present embodiment, the device control section 10 starts the warm-up of the image forming section 13 only in a case where both the foregoing Condition A and the following Condition B are satisfied (i.e., only in a case where both the steps S3 and S31 are "Yes").

Condition B: execution authority information stored in the login user information storage section 17 indicates that a function for which the warm-up needs to be carried out is available.

This makes it possible to prevent the warm-up from being unnecessarily carried out for a function which is not available to the user.

According to the descriptions above, the user information management DB 26 of the authentication server 2 (i) stores the execution authority information shown in FIG. 10 in addition to the user authentication information and (ii) transmits, to the multifunction peripheral 1*a*, the execution authority information associated with the user who is in the login state. However, the present embodiment is not limited to this. The user information management DB 26 can store output sheet number limiting information per user, instead of the execution authority information. FIG. 12 is a view illustrating an example of a management table for the output sheet number limiting information. The output sheet number limiting information is indicative of a balance of the number of sheets allowed for each user to output for each type of functions (see FIG. 12). In this case, the authentication server 2 obtains information of the number of sheets having been outputted from each multifunction peripheral 1*a*, and updates the output sheet number limiting information.

In a case where a user authentication is successfully carried out, the authentication server 2 transmits, to the multifunction peripheral 1*a*, (i) an authentication result and (ii) output sheet number limiting information associated with the user who is in a login state. Then, the device control section 10 of the multifunction peripheral 1a stores, in the login user information storage section 17, the output sheet number limiting information received from the authentication server 2. Moreover, when the device control section 10 receives a completion notice from the external application 33, the device control section 10 deletes output sheet number limiting information stored in the login user information storage section 17. This allows the login user information storage section 17 to store output sheet number limiting information associated with the user who is currently in the login state.

In this case, the device control section 10 checks, the step S31, the output sheet number limiting information which is stored in the login user information storage section 17, so as to judge whether or not a balance of the number of sheets allowed to be outputted for a function for which the warm-up needs to be carried out is not less than 1. In a case where the balance is not less than 1, the device control section 10 (i) determines that the function is available (Yes in S31), and (ii) starts the warm-up (S4). On the other hand, in a case where the balance is zero, the device control section 10 (i) determines that the function is not available (No in S31), and (ii) does not start the warm-up.

In a case where, for example, output sheet number limiting information associated with the user ID of "1" (see FIG. 12) is stored in the login user information storage section 17, a balance of the number of sheets allowed to be outputted for the copying function, for which the warm-up of the image forming section 13 needs to be carried out, is 154. Therefore, the device control section 10 starts the warm-up. On the other hand, in a case where output sheet number limiting information associated with the user ID of "2" (see FIG. 12) is stored in the login user information storage section 17, (i) a balance of the number of sheets allowed to be outputted for the copying function, for which the warm-up of the image forming section 13 needs to be carried out, is 0, and also (ii) a balance of the number of sheets allowed to be outputted for the print function, for which the warm-up of the image forming section 13 needs to be carried out, is 0. In this case, the device control section 10 does not start the warm-up.

The device control section 10 starts the warm-up of the image forming section 13 only in a case where both the foregoing Condition A and the following Condition C are satisfied.

Condition C: Output sheet number limiting information stored in the login user information storage section 17 indicates that a balance of the number of sheets allowed to be outputted for a function for which the warm-up needs to be carried out is 1 or more.

This makes it possible to prevent the warm-up from being unnecessarily carried out for a function which is not available to the user.

The user information management DB 26 of the authentication server 2 can store both execution authority information as shown in FIG. 10 and output sheet number limiting information as shown in FIG. 12. In this case, the authentication server 2 transmits, to the multifunction peripheral 1a, (i) an authentication result indicative of success of authentication, (ii) execution authority information associated with a user who is in a login state, and (iii) output sheet number limiting information associated with the user. Then, the login user information storage section 17 of the multifunction peripheral 1a stores the execution authority information and the output sheet number limiting information received from the authentication server 2.

Then, in the step S31, the device control section 10 checks both the execution authority information and the output sheet number limiting information so as to judge whether or not the function which has been determined in the step S3 as requiring the warm-up is available. That is, the warm-up is started only in a case where the function is determined to be available based on both the execution authority information and the output sheet number limiting information. In a case where the function is determined to be not available based on at least one of the execution authority information and the output sheet number limiting information, the warm-up is not started.

MODIFIED EXAMPLES

A system of the present invention is not limited to the Embodiments 1 and 2, but can be modified in various ways. The following describes modified examples of the present invention.

Modified Example 1

According to the above described Embodiments, the switching operation is carried out, as the warm-up, so that a mode switching target member (here, an image forming section 13) is switched from a waiting mode to a normal operation mode. However, a part of the switching operation can be carried out in the step S4.

For example, in addition to the waiting mode and the normal operation mode, the image forming section 13 can have at least one energy saving mode in which a contact face of a fixing device, which contact face is to contact with toner, has a temperature higher than that in the waiting mode but lower than that in the normal operation mode. In other words, the energy saving mode consumes electric power more than the waiting mode but less than the normal operation mode. It is possible to switch over, in the step S4, the image forming section 13 from the waiting mode to any of such energy saving modes.

In such a case, the application information storage section 16 stores, for each external application 33, return destination mode information indicative of a mode to which the operation mode is returned. The return destination mode information can be registered by a user based on information recommended by a creator of the external application 33 or can be registered in advance in the application information storage section.

Then, in the step S4, it is possible that the device control section 10 (i) reads out, from the application information storage section 16, return destination mode information associated with the application identification information selected in the step S1, and then (ii) starts the warm-up so that the operation mode is switched to a mode indicated by the return destination mode information.

Modified Example 2

According to the above descriptions (including Modified Example 1), the application information storage section 16 stores, for each of functions of the multifunction peripheral which was carried out in cooperation with the external application 33 in the past, (i) function information indicative of a type of a corresponding function and (ii) particular process state information, regardless of whether or not the corresponding function is a function for which the warm-up needs to be carried out. Alternatively, it is possible that the application information storage section 16 does not store function information, but stores, in association with application identification information, particular process state information for an application which executed, in a past cooperative process, a function requiring the warm-up. Note that the particular process state information is indicative of a URL which was set in the web browser section 15 when an execution start instruction on the function was received from an external application.

FIG. 13 illustrates an example of an application information management table stored in the application information storage section 16 of the present modified example. The application information storage section 16 does not store function information but stores, as particular process state information, a URL which was set in the web browser section 15 when an execution start instruction on a function for which the warm-up needs to be carried out was received from a corresponding application in a past cooperative process (see FIG. 13).

According to the present modified example, when the device control section 10 accepts, via the operation section 11, an instruction on registering a new external application in the application information management table, the device control section 10 additionally registers, in the application information management table, application correspondence information in which application identification information (an application name and a registration address) and particular process state information indicative of "None" are associated with each other. In a case where the device control section 10 accepts an instruction on editing application identification information which has already been registered in the application information management table, the device control section 10 changes particular process state information, which is contained in target application correspondence information, into "None".

Moreover, the device control section 10 carries out, in a step S9, an updating process with respect to function information in the following manner. That is, the device control section 10 judges whether or not a function to which an execution start instruction has been issued in a step S5 is a function for which a warm-up needs to be carried out. In a case where the execution start instruction is directed to a function which does not require a warm-up, the device control section 10 leaves the application correspondence information as it is without updating. On the other hand, in a case where the execution start instruction is directed to a function which requires a warm-up, the device control section 10 additionally registers, as particular process state information, a URL which is set in the web browser section 15 when the execution start instruction is received. In this manner, each piece of application correspondence information in the application information management table is allowed to contain, as particular process state information, a URL which was set in the web browser section 15 when an execution start instruction for a function requiring the warm-up was received in a past cooperative process.

In this case, instead of carrying out the steps S2 and S3 in FIG. 3, the device control section 10 can judge whether or not particular process state information associated with selected application identification information matches a URL (current process state information) which is currently set in the web browser section 15. In a case where the particular process state information matches the URL, the device control section 10 (i) determines that a warm-up needs to be carried out and then (ii) proceeds to the step S4. That is, the device control section 10 starts the warm-up in a case where the following Condition A' is satisfied instead of the foregoing Condition A.

Condition A': A currently set URL (current process state information), which is obtained from the web browser section 15, matches particular process state information which is registered in the application information storage section 16.

<Others>

According to Embodiment 2, the authentication server 2 is provided outside the multifunction peripheral 1a and the information processing apparatus 3. However, the authentication server 2 can, be incorporated in the multifunction peripheral 1a or the information processing apparatus 3.

According to the Embodiments above described, the image forming section 13 exemplifies the mode switching target, member. However, the mode switching target member is not limited to the image forming section 13. For example, an image reading section 12 can serve as the mode switching target member having a normal operation mode and waiting mode. The image reading section 12 includes an exposure unit for scanning an image of a document. The exposure unit emits light whose amount is dependent on an amount of electric power. However, the exposure unit is desired to stably emit a constant amount of light. In addition, there is a demand for a higher energy saving effect. However, some type of light source of the exposure unit takes a long time to emit a stable amount of light after electric power is supplied. In view of this, the image reading section 12 can be configured to be switchable between (i) a normal operation mode in which light can be emitted in a constant amount and (ii) a waiting mode in which power consumption is lower than that of the normal operation mode. With the configuration, the image reading section 12 is set to be in the waiting mode while the image reading section 12 is not in operation. Then, before the image reading section 12 starts to operate, a warm-up is carried out so that the image reading section 12 is switched from the waiting mode to the normal operation mode.

Note that, in a case where two mode switching target members, i.e., the image reading section 12 and the image forming section 13 are provided, the device control section judges, in the step S3, whether or not function information contains (i) information indicative of a type of function (e.g., a scanning function or a copying function) which causes the image reading section 12 to be operated, and/or (ii) information indicative of a type of function (e.g., a printing function or the copying function) which causes the image forming section 13 to be operated. In a case where the function information contains information indicative of a type of function (e.g., the scanning function) which causes the image reading section 12 to be operated, the warm-up is started in the step S4 so that the image reading section 12 is switched from the waiting mode to the normal operation mode. In a case where the function information contains information indicative of a type of function (e.g., the printing function) which causes the image forming section 13 to be operated, a warm-up is started in the step S4 so that the image forming section 13 is switched from the waiting mode to the normal operation mode. In a case where the function information contains information indicative of a type of function (e.g., the copying function) which causes both the image reading section 12 and the image forming section 13 to be operated, the warm-up is started in the step S4 so that each of the image reading section 12 and the image forming section 13 is switched from the waiting mode to the normal operation mode.

According to the description above, the URL which is set in the web browser section 15 when the execution start instruction is received is registered as the particular process state information. However, the particular process state information is not limited to this.

For example, it is possible to register, as particular process state information, at least one of (i) a first URL which is set in the web browser section 15 when an execution start instruction is received and (ii) a second URL which was set in advance of the first URL by a certain number (e.g., one or two) of stage(s). Depending on an external application 33, a number of screens are sequentially displayed on the display section 11b until a corresponding function which requires a warm-up is carried out. In such a case, a URL which was set shortly before the execution start instruction is received can be assumed to be a URL after which the function requiring the warm-up is highly possible to be carried out. Therefore, registering, as the particular process state information, the URL which was set before the execution start instruction is received makes it possible to start the warm-up at an earlier timing.

This will be concretely described with reference to FIGS. 5 through 8. As described above, when login information is entered via the screen 42 shown in FIG. 5, the screen 42 is shifted to the screen 43 shown in FIG. 6. Then, when a print button on the screen 43 is pressed, the screen 43 is shifted to the screen 45 shown in FIG. 8. Then, when the start button 45a is pressed on the screen 45, a URL "http://example.com/docmng/print/start.asp" is set in the web browser section 15. Subsequently, the external application section 33 generates an execution start instruction on the printing function, and transmits the execution start instruction to the multifunction peripheral 1. According to this example, a URL which is set in the web browser section 15 when the execution start instruction on the printing function is received is "http://example.com/docmng/print/start.asp". A URL which was set just before "http://example.com/docmng/print/start.asp" is a URL corresponding to the screen 45 shown in FIG. 8, that is, "http://example.com/docmng/print.asp". A URL which was set just before "http://example.com/docmng/print.asp" is a URL corresponding to the screen 43 shown in FIG. 6, that is, "http://example.com/docmng/menu.asp". In this case, for example, the device control section 10 can register, as particular process state information, at least one of (i) the URL "http://example.com/docmng/print.asp", which was set one stage before the execution start instruction is received, and (ii) the URL "http://example.com/docmng/print/start.asp", which is set when the execution start instruction is received.

Note that a general web browser has a function to store a URL which was set prior to a current stage by predetermined number of stages. This allows the device control section 10 to easily obtain, from the web browser section 15, (i) a first URL which is set in the web browser section 15 when an execution start instruction is received and (ii) a second URL which was set in advance of the first URL by a predetermined number (e.g., one or two) of stage(s).

A multifunction peripheral of the present invention carries out a cooperative process in cooperation with an application selected from a plurality of applications which are executable on an external information processing apparatus, the multifunction peripheral including: a mode switching target member having (i) a normal operation mode and (ii) a waiting mode which is lower in power consumption than the normal operation mode; a registration processing section which registers, in a storage section, application correspondence information of each of the plurality of applications, the application correspondence information containing function information and particular process state information which are associated with each other, the function information being indicative of a type of a function which was executed by the multifunction peripheral in cooperation with the each of the plurality of applications in a past cooperative process, and the particular process state information being indicative of at least one of (i) a first stage of a process of the each of the plurality of applications at which first stage an execution start instruction on the function is received from the each of the plurality of applications and (ii) a second stage which precedes the first stage by a predetermined number of stage(s); an information obtaining section which obtains current process state information while the multifunction peripheral is carrying out a cooperative process in cooperation with an application selected from the plurality of applications, the current process state information being indicative of a current stage of a process of the application selected from the plurality of applications; and a control section which judges whether or not a predetermined start condition is satisfied, in a case where the control section determines that the predetermined start condition is satisfied, the control section starting (i) a switching operation for switching the mode switching target member from the waiting mode to the normal operation mode or (ii) a part of the switching operation, the predetermined start condition including at least the following Condition A.

Condition A: (i) particular process state information which matches current process state information obtained by the information obtaining section is registered in the storage section and (ii) function information associated with the particular process state information is indicative of a particular function which causes the mode switching target member to be operated.

According to the configuration, in the cooperative process carried out in cooperation with the selected application, in a case where (i) particular process state information matching current process state information is registered in the storage section and (ii) a type of function indicated by function information associated with the particular process state information is a particular function which causes the mode switching target member to be operated, (a) a switching operation for switching the mode switching target member, which is used in the particular function, from the waiting mode to the normal operation mode or (b) a part of the switching operation is started. This makes it possible to start, before the execution start instruction on the particular function is received, a warm-up, which is (i) the switching operation for switching the mode switching target member from the waiting mode to the normal operation mode or (ii) a part of the switching operation. Consequently, it is possible to reduce a user's waiting time period.

Moreover, particular process state information is indicative of at least one of (i) a first stage of a process of a corresponding application at which first stage an execution start instruction on a corresponding function is received from the corresponding application and (ii) a second stage which precedes the first stage by a predetermined number of stage(s). Therefore, in a case where current process state information matches particular process state information, it is highly possible that an execution start instruction on a corresponding function will be received in the future. Therefore, it is possible to reduce cases where the warm-up is carried out but the corresponding function is not carried out. This makes it possible to reduce unnecessary power consumption.

It is preferable that the multifunction peripheral of the present invention further includes: a web browser section which operates based on a web browser so as to communicate, based on a URL (uniform resource locator) which is set in the web browser section, information with a corresponding one of the plurality of applications, the registration processing section registering, as the particular process state information, at least one of (i) a first URL which was set, in a past cooperative process, in the web browser section when an execution start instruction on a function whose type is indicated by the function information is received from the each of the plurality of applications and (ii) a second URL which was set in advance of the first URL by a predetermined number of stage(s), and the information obtaining section obtaining, as the current process state information, a URL which is currently set in the web browser section.

According to the configuration, the URL, which is set in the web browser, is used. This makes it possible to easily register the particular process state information and to easily obtain the current process state information.

A multifunction peripheral of the present invention is a multifunction peripheral which carries out a cooperative process in cooperation with an application selected from a plurality of applications which are executable on an external information processing apparatus, the multifunction peripheral includes: a mode switching target member having (i) a normal operation mode and (ii) a waiting mode which is lower in power consumption than the normal operation mode; a registration processing section which registers particular process state information in a storage section for, among the plurality of applications, a certain application which executed, in a past cooperative process, a particular function causing the mode switching target member to be operated, the particular process state information being indicative of at least one of (i) a first stage of a process of the certain application at which first stage an execution start instruction on the particular function was received from the certain application and (ii) a second stage which precedes the first stage by a predetermined number of stage(s); an information obtaining section which obtains current process state information while the multifunction peripheral is carrying out a cooperative process in cooperation with an application selected from the plurality of applications, the current process state information being indicative of a current stage of a process of the application selected from the plurality of applications; and a control section which judges whether or not a predetermined start condition is satisfied, in a case where the control section determines that the predetermined start condition is satisfied, the control section starting (i) a switching operation for switching the mode switching target member from the waiting mode to the normal operation mode or (ii) a part of the switching operation, the predetermined start condition including at least the following Condition A'.

Condition A': current process state information obtained by the information obtaining section matches particular process state information registered in the storage section.

According to the configuration, in a cooperative process carried out with the selected application, in a case where current process state information matches particular process state information, the warm-up, which is (i) a switching operation for switching the mode switching target member from the waiting mode to the normal operation mode or (ii) a part of the switching operation, is started. Here, the particular process state information is indicative of at least one of (i) a first stage of a process of an application at which first stage an execution start instruction on a particular function which causes the mode switching target member to be operated was received from the application in a past cooperative process and (ii) a second stage which precedes the first stage by a predetermined number of stage(s). It is therefore possible to start the warm-up before the execution start instruction on the particular function is received, provided that the Condition A' is satisfied. Consequently, it is possible to reduce a user's waiting time period.

Moreover, in a case where the current process state information matches the particular process state information, it is highly possible that an execution start instruction on a corresponding function will be received in the future. Therefore, it is possible to reduce cases where the warm-up is carried, out but the corresponding function is not carried out. This makes it possible to reduce unnecessary power consumption.

It is preferable that the multifunction peripheral of the present invention, further includes: a web browser section which operates based on a web browser so as to communicate, based on a URL (uniform resource locator) set in the web browser section, information with a corresponding one of the plurality of applications, the registration processing section registering, as the particular process state information, at least one of (i) a first URL which was set in the web browser section when an execution start instruction on the particular function was received from the certain application in a past cooperative process and (ii) a second URL which was set in advance of the first URL by a predetermined number of stage(s), and the information obtaining section obtaining, as the current process state information, a URL which is currently set in the web browser section.

According to the configuration, the URL, which is set in the web browser, is used. This makes it possible to easily register the particular process state information and to easily obtain the current process state information.

It is possible that the multifunction peripheral of the present invention further includes: an execution authority information storage section in which execution authority information is stored, the execution authority information being indicative of a function available to a user who is in a login state, the predetermined start condition further including the following Condition B.

Condition B: the execution authority information stored in the execution authority information storage section indicates that the particular function is available.

According to the configuration, in a case where the execution authority information indicates that the particular function is available, the switching operation for switching the mode switching target member from the waiting mode to the normal operation mode or a part of the switching operation is started. Therefore, in a case where the particular function is not available to the login user, the switching operation or the part of the switching operation is not started. This makes it possible to prevent unnecessary power consumption, and consequently an energy saving effect can be improved.

According to the multifunction peripheral of the present invention, it is possible that: the mode switching target member is an image forming section for forming an image on a recording sheet, the multifunction peripheral further including: an output sheet number limiting information storage section in which output sheet number limiting information is stored, the output sheet number limiting information being indicative of the number of recording sheet allowed for a user in a login state to output by use of the particular function, the predetermined start condition further including the following Condition C.

Condition C: the number of recording sheet, indicated by the output sheet number limiting information stored in the output sheet number limiting information storage section, is equal to or more than 1.

According to the configuration, in a case where the number of the recording sheets, indicated by output sheet number limiting information associated with the login user, is zero, the switching operation or the part of the switching operation is not started. This makes it possible to prevent unnecessary power consumption, and consequently an energy saving effect can be improved.

According to the multifunction peripheral of the present invention, it is possible that: the mode switching target member further has at least one energy saving mode which is higher in power consumption than the waiting mode but lower in power consumption than the normal operation mode; the storage section stores return destination mode information so that the particular process state information and the return destination mode information are associated with each other, the return destination mode information being indicative of one of the at least one energy saving mode and the normal operation mode; and the control section carries out the switching operation or a part of the switching operation by setting the mode switching target member to a mode indicated by return destination mode information associated with particular process state information which matches current process state information obtained by the information obtaining section.

Depending on an application, it takes a long time to carry out a particular function after a certain stage indicated by its corresponding particular process state information is attained. In the case of such application, if a warm-up is started when the certain stage indicated by its corresponding particular process state information is attained, unnecessary power consumption is to occur. However, with the configuration of the present invention, it is possible to select a return destination mode according to an application. Therefore, for example, for an application which takes a long time to carry out a particular function after a certain stage indicated by its corresponding particular process state information is attained, it is possible to set the return destination mode to the energy saving mode instead of the normal operation mode. It is therefore possible to improve an energy saving effect.

According to the multifunction peripheral of the present invention, it is preferable that: the registration processing section updates information stored in the storage section; the storage section stores application identification information, which identifies each of the plurality of applications, so that the application identification information and the particular process state information are associated with each other; and in a case where application identification information is changed, the registration processing section deletes particular process state information associated with the application identification information.

If particular process state information is left as it is when application identification information is changed, whether to start the switching operation or a part of the switching operation is to be determined based on the particular process state information associated with the old application identification information. According to the configuration of the present invention, the particular process state information is deleted when the application identification information is changed. Therefore, such a problem can be solved.

The present invention is not limited to the description of the embodiments above, but may be altered by a skilled person within the scope of the claims. An embodiment based on a proper combination of technical means disclosed in different embodiments is encompassed in the technical scope of the present invention.

Lastly, each blocks of the multifunction peripherals 1 and 1a can be configured by hardware logic or realized by software with the use of CPU as follows.

That is, each of the multifunction peripherals 1 and 1a includes a CPU (central processing unit), a ROM (read only memory), a RAM (random access memory), and a memory device (memory medium) such as a memory. The CPU executes instructions of control programs for realizing the functions. In the ROM, the programs are stored. Into the RAM the programs are loaded. In the memory device, the programs and various data are stored. The objective of the present invention can also be achieved, by (i) supplying a storage medium, in which program codes (executable programs, intermediate code programs, source programs) of programs for controlling the device control section 10, being configured by software for realizing the functions, are stored so that a computer can read them, to the multifunction peripherals 1 and 1a, and then (ii) causing the computer (or CPU or MPU) to read and execute the program codes stored in the storage medium.

The storage medium can be, for example, a tape, such as a magnetic tape or a cassette tape; a disk including (i) a magnetic disk such as a Floppy (Registered Trademark) disk or a hard disk and (ii) an optical disk such as CD-ROM, MO, MD, DVD, or CD-R; a card such as an IC card (memory card) or an optical card; or a semiconductor memory such as a mask ROM, EPROM, EEPROM, or flash ROM.

Alternatively, the multifunction peripherals 1 and 1a can be arranged to be connected to a communications network so that the program codes are delivered over the communications network. The communications network is not limited to a specific one, and therefore can be, for example, the Internet, an intranet, extranet, LAN, ISDN, VAN, CATV communications network, virtual private network, telephone line network, mobile communications network, or satellite communications network. The transfer medium which constitutes the communications network is not limited to a specific one, and therefore can be, for example, wired line such as IEEE 1394, USB, electric power line, cable TV line, telephone line, or ADSL line; or wireless such as infrared radiation (IrDA, remote control), Bluetooth (Registered Trademark), 802.11 wireless, HDR, mobile telephone network, satellite line, or terrestrial digital network. Note that, the present invention can be realized by a computer data signal (i) which is realized by electronic transmission of the program code and (ii) which is embedded in a carrier wave.

INDUSTRIAL APPLICABILITY

The present invention is suitably applicable to a multifunction peripheral that realizes a plurality of functions such as a copying function, a scanning function, and a facsimile sending/receiving function.

REFERENCE SIGNS LIST 1, 1a: Multifunction peripheral
2: Authentication server
3: Information processing apparatus
10: Device control section (Control section, Registration processing section, Information obtaining section)
11: Operation section
12: Image reading section (Mode switching target member)
13: Image forming section (Mode switching target member)
16: Application information storage section (storage section)
17: Login user information storage section (Execution authority information storage section, Output sheet number limiting information storage section)
31: External application section
32: External application storage section
33: External application
100: Multifunction peripheral control system

The invention claimed is:
1. A multifunction peripheral which carries out a cooperative process in cooperation with an application selected from a plurality of applications which are executable on an external information processing apparatus, said multifunction peripheral comprising:

a mode switching target member having (i) a normal operation mode and (ii) a waiting mode which is lower in power consumption than the normal operation mode;

a registration processing section which registers, in a storage section, application correspondence information of each of the plurality of applications, the application correspondence information containing function information and particular process state information which are associated with each other, the function information being indicative of a type of a function which was executed by the multifunction peripheral in cooperation with said each of the plurality of applications in a past cooperative process, and the particular process state information being indicative of at least one of (i) a first stage of a process of said each of the plurality of applications at which first stage an execution start instruction on the function is received from said each of the plurality of applications and (ii) a second stage which precedes the first stage by a predetermined number of stage(s);

an information obtaining section which obtains current process state information while the multifunction peripheral is carrying out a cooperative process in cooperation, with an application selected from the plurality of applications, the current process state information being indicative of current stage of a process of the application selected from the plurality of applications; and a control section which judges whether or not a predetermined start condition is satisfied, in a case where the control section determines that the predetermined start condition is satisfied, the control section starting (i) a switching operation for switching the mode switching target member from the waiting mode to the normal operation mode or (ii) a part of the switching operation, the predetermined start condition including at least the following Condition A, Condition A: (i) particular process state information which matches current process state information obtained by the information obtaining section registered in the storage section and (ii) function information associated with the particular process state information is indicative of a particular function which causes the mode switching target member to be operated.

2. The multifunction peripheral as set forth in claim 1, further comprising:

a web browser section which operates based on a web browser so as to communicate, based on a URL (uniform resource locator) which is set in the web browser section, information with a corresponding one of the plurality of applications, the registration processing section registering, as the particular process state information, at least one of (i) a first URL which was set, in a past cooperative process, in the web browser section when an execution start instruction on a function whose type is indicated by the function information is received from said each of the plurality of applications and (ii) a second URL which was set in advance of the first URL by a predetermined number of stage(s), and the information obtaining section obtaining, as the current process state information, a URL which is currently set in the web browser section.

3. The multifunction peripheral as set forth in claim 1, further comprising:

an execution authority information storage section in which execution authority information is stored, the execution authority information being indicative of a function available to a user who is in a login state, the predetermined start condition further including the following Condition B, Condition B: the execution authority information stored in the execution authority information storage section indicates that the particular function is available.

4. The multifunction peripheral as set forth in claim 1, wherein:

the mode switching target member is an image forming section for forming an image on a recording sheet, said multifunction peripheral further comprising:

an output sheet number limiting information storage section in which output sheet number limiting information is stored, the output sheet number limiting information being indicative of the number of recording sheet allowed for a user in a login state to output with use of the particular function, the predetermined start condition further including the following Condition C, Condition C: the number of recording sheet, indicated by the output sheet number limiting information stored in the output sheet number limiting information storage section, is equal to or more than 1.

5. The multifunction peripheral as set forth in claim 1, wherein:

the mode switching target member further has at least one energy saving mode which is higher in power consumption than the waiting mode but lower in power consumption than the normal operation mode;

the storage section stores return destination mode information so that the particular process state information and the return destination mode information are associated with each other, the return destination mode information being indicative of one of the at least one energy saving mode and the normal operation mode; and the control section carries out the switching operation or a part of the switching operation by setting the mode switching target member to a mode indicated by return destination mode information associated with particular process state information which matches current process state information obtained by the information obtaining section.

6. The multifunction peripheral as set forth in claim 1, wherein:

the registration processing section updates information stored in the storage section;

the storage section stores application identification information, which identifies each of the plurality of applications, so that the application identification information and the particular process state information are associated with each other; and in a case where application identification information is changed, the registration processing section deletes particular process state information associated with the application identification information.

7. A multifunction peripheral which carries out a cooperative process in cooperation with an application selected from a plurality of applications which are executable on an external information processing apparatus, said multifunction peripheral comprising:

a mode switching target member having (i) a normal operation mode and (ii) a waiting mode which is lower in power consumption than the normal operation mode;

a registration processing section which registers particular process state information in a storage section for, among the plurality of applications, a certain application which executed, in a past cooperative process, a particular function causing the mode switching target member to be operated, the particular process state information being indicative of at least one of (i) a first stage of a process of the certain application at which first stage an execution start instruction on the particular function was received from the certain application and (ii) a second stage which precedes the first stage by a predetermined number of stage(s);

an information obtaining section which obtains current process state information while the multifunction peripheral is carrying out a cooperative process in cooperation with an application selected from the plurality of applications, the current process state information being indicative of a current stage of a process of the application selected from the plurality of applications; and a control section which judges whether or not a predetermined start condition is satisfied, in a case where the control section determines that the predetermined start condition is satisfied, the control section starting (i) a switching operation for switching the mode switching target member from the waiting mode to the normal operation mode or (ii), a part of the switching operation, the predetermined start condition including at least the following Condition A', Condition A': current process state information obtained by the information obtaining section matches particular process state information registered in the storage section.

8. The multifunction peripheral as set forth in claim 7, further comprising:

a web browser section which operates based on a web browser so as to communicate, based on a URL (uniform resource locator) set in the web browser section, information with a corresponding one of the plurality of applications, the registration processing section registering, as the particular process state information, at least one of (i) a first URL which was set in the web browser section when an execution start instruction on the particular function was received from the certain application in a past cooperative process and (ii) a second URL which was set in advance of the first URL by a predetermined number of stage(s), and the information obtaining section obtaining, as the current process state information, a URL which is currently set in the web browser section.

9. The multifunction peripheral as set forth in claim 7, further comprising:

an execution authority information storage section in which execution authority information is stored, the execution authority information being indicative of a function available to a user who is in a login state, the predetermined start condition further including the following Condition B, Condition B: the execution authority information stored in the execution authority information storage section indicates that the particular function is available.

10. The multifunction peripheral as set forth in claim 7, wherein:

the mode switching target member is an image forming section for forming an image on a recording sheet, said multifunction peripheral further comprising:

an output sheet number limiting information storage section in which output sheet number limiting information is stored, the output sheet number limiting information being indicative of the number of recording sheet allowed for a user in a login state to output by use of the particular function, the predetermined start condition further, including the following Condition C, Condition C: the number of recording sheet, indicated by the output sheet number limiting information stored in the output sheet number limiting information storage section, is equal to or more than 1.

11. The multifunction peripheral as set forth in claim 7, wherein:

the mode switching target member further has at least one energy saving mode which is higher in power consumption than the waiting mode but lower in power consumption than the normal operation mode;

the storage section stores return destination mode information so that the particular process state information and the return destination mode information are associated with each other, the return destination mode information being indicative of one of the at least one energy saving mode and the normal operation mode; and the control section carries out the switching operation or a part of the switching operation by setting the mode switching target member to a mode indicated by return destination mode information associated with particular process state information which matches current process state information obtained by the information obtaining section.

12. The multifunction peripheral as set forth in claim 7, wherein:

the registration processing section updates information stored in the storage section;

the storage section stores application identification information, which identifies each of the plurality of applications, so that the application identification information and the particular process state information are associated with each other; and in a case where application identification information is changed, the registration processing section deletes particular process state information associated with the application identification information.

* * * * *